(12) United States Patent
Takahashi et al.

(10) Patent No.: US 11,871,065 B2
(45) Date of Patent: Jan. 9, 2024

(54) INFORMATION PROCESSING APPARATUS, REPRODUCTION PROCESSING APPARATUS, INFORMATION PROCESSING METHOD, AND REPRODUCTION PROCESSING METHOD

(71) Applicant: Sony Group Corporation, Tokyo (JP)

(72) Inventors: Ryohei Takahashi, Tokyo (JP); Mitsuhiro Hirabayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/426,113

(22) PCT Filed: Jan. 16, 2020

(86) PCT No.: PCT/JP2020/001273
§ 371 (c)(1),
(2) Date: Jul. 28, 2021

(87) PCT Pub. No.: WO2020/183900
PCT Pub. Date: Sep. 17, 2020

(65) Prior Publication Data
US 2022/0109901 A1 Apr. 7, 2022

Related U.S. Application Data

(60) Provisional application No. 62/816,631, filed on Mar. 11, 2019.

(51) Int. Cl.
*H04N 21/418* (2011.01)
*H04N 21/231* (2011.01)
*H04N 21/234* (2011.01)

(52) U.S. Cl.
CPC ... *H04N 21/4183* (2013.01); *H04N 21/23109* (2013.01); *H04N 21/23418* (2013.01)

(58) Field of Classification Search
CPC ......... H04N 21/4183; H04N 21/23109; H04N 21/23418
See application file for complete search history.

(56) References Cited

U.S. PATENT DOCUMENTS

2003/0206586 A1* 11/2003 Ando ................... H04N 21/835
375/E7.009
2011/0119395 A1 5/2011 Ha
(Continued)

FOREIGN PATENT DOCUMENTS

| JP | 2015153441 A | 8/2015 |
| WO | 2018/083999 A1 | 5/2018 |
| WO | WO-2019038473 A1 | 2/2019 |
| WO | 2020/032248 A1 | 2/2020 |

OTHER PUBLICATIONS

International Search Report and Written Opinion dated Mar. 24, 2020, received for PCT Application PCT/JP2020/001273, Filed on Jan. 16, 2020, 9 pages including English Translation.

(Continued)

*Primary Examiner* — Sumaiya A Chowdhury
(74) *Attorney, Agent, or Firm* — XSENSUS LLP

(57) ABSTRACT

Provided are an information processing apparatus, a reproduction processing apparatus, an information processing method, and a reproduction processing method that can easily provide a viewing experience that meets the needs of a viewer. A data acquiring unit (101) acquires a content including a plurality of component streams. A file generating unit (105) generates content random access point (RAP) information indicating random access points of the content on the basis of random access points of the component streams of the content that has been acquired by the data acquiring unit (101).

7 Claims, 16 Drawing Sheets

(56) References Cited

U.S. PATENT DOCUMENTS

| | | | |
|---|---|---|---|
| 2012/0272286 A1* | 10/2012 | Pasternak | H04N 21/8455 |
| | | | 725/146 |
| 2013/0246643 A1* | 9/2013 | Luby | H04L 65/762 |
| | | | 709/231 |
| 2015/0110192 A1 | 4/2015 | Wang | |
| 2019/0251743 A1* | 8/2019 | Koyama | G09B 21/00 |

OTHER PUBLICATIONS

"Information Technology—Coding of Audio-Visual Objects—Part 12: ISO base media file format, Technical Corrigendum 1", ISO/IEC FDIS 14496-12, Fifth Edition, Dec. 15, 2015, pp. 1-267.

"Technologies under consideration on carriage of PC data", 125. MPEG Meeting; Jan. 14, 2019-Jan. 18, 2019; Marrakech; (Motion Picture Expert Group or ISO/IEC JTC1/SC29/WG11),No. n18267 Jan. 18, 2019 (Jan. 18, 2019), XP030212821, Retrieved from the Internet: URL:http://phenix.int-evry.fr/mpeg/doc_end_user/documents/ 125_Marrakech/wgll/w18267.zip N18267—Technologies under consideration for carriage of point cloud data.docx [retrieved on Jan. 18, 2019].

Xu Yiling et al: "Introduction to Point Cloud Compression", ZTE Communications, [Online] vol. 16, No. 3, Aug. 24, 2018 (Aug. 24, 2018), pp. 3-8, XP055687159,DOI:10.19729/j.cnki.1673@BUL-LET5188.2018.03.00 2 Internet Retrieved from the Internet: URL:https:// res-www.zte.eom.cn/mediares/magazine/publication/com_en/article/ 201803/X UYiling.pdf>[retrieved on Apr. 20, 2020].

* cited by examiner

FIG. 4

```
aligned(8) class VPCCGroupBox() extends EntityToGroupBox(`vpra`, version, flags) {
  for(i=0; i<num_entities_in_group; i++) {
    unsigned int(4) DataType;
    unsigned int(3) Layer_id;
    bit(4)          reserved = 0;
  }
  unsigned int(1) rap_aligned;  ⎫
  bit(7)          reserved = 0;  ⎬ 321
  vpcc_profile_tier_level() //defined in V-PCC spec ⎭
}
```

```
aligned(8) class VPCCGroupBox() extends EntityToGroupBox('vpra', version, flags) {
  for(i=0; i<num_entities_in_group; i++) {
    unsigned int(4) DataType;
    unsigned int(3) Layer_id;
    bit(4) reserved = 0;
    unsigned int(1) rap_aligned;     } 411
    bit(7) reserved = 0;
    vpcc_profile_tier_level() //defined in V-PCC spec
  }
}
```

410

411

```
aligned(8) class VPCCRapInfoBox() extends FullBox(`vpra', version = 0, 0) {
  unsigned int(32)  entry_count;
  for (i=0; i < entry_conunt; i++){
    unsigned int(32)  sample_number;
  }
}
```

*FIG. 12*

```
aligned(8) class VPCCRapInfoBox() extends FullBox(`vpra', version = 0, 0) {
  unsigned int(32)  entry_count;
  for (i=0; i < entry_conunt; i++){
    unsigned int(32)  sample_numbert;
    unsigned int(1)  is_all_RAP;
    unsigned int(7)  reserved = 0;
    if (!is_all_RAP){
      unsigned int(32) num_entities_in_group;
      for (j=0; j < num_entities_in_group; j++) {
        unsigned int(1)  is_non_RAP;
        unsigned int(7)  reserved = 0;
        if (is_non_RAP)
          unsigned int(16) distance;
      }
    }
  }
}
```

FIG. 14

```
aligned(8) class VPCCRapInfoBox() extends FullBox(`vpra', version = 0, 0) {
  unsigned int(32)  entry_count;
  for (i=0; i < entry_conunt; i++){
    unsigned int(32)  sample_number;
    unsigned int(1)  is_all_RAP;
    unsigned int(7)  reserved = 0;
    if (!is_all_RAP){
      unsigned int(32) num_entities_in_group;
      for (j=0; j < num_entities_in_group; j++) {
        unsigned int(1)  is_non_RAP;
        unsigned int(1)  is_decode_optional;
        unsigned int(7)  reserved = 0;
        if (is_non_RAP)
          unsigned int(16) distance;
      }
    }
  }
}
```

```
aligned(8) class VPCCRapInfoBox() extends FullBox(`vpra', version = 0, 0) {
  unsigned int(32)  entry_count;
  for (i=0; i < entry_conunt; i++){
    unsigned int(32)  sample_number;
    unsigned int(32)  num_entities_in_group;
    for (j=0; j < num_entities_in_group; j++) {
      unsigned int(1)  is_DTS¥aligned;
      unsigned int(1)  is_all_RAP;
      unsigned int(6)  reserved = 0;
      if (!is_all_RAP){
        unsigned int(8) sample_offset;
      if (is_non_RAP)
        unsigned int(16) distance;
      }
    }
  }
}
```
510

FIG. 17

```
                                                    600 aligned(8) class VPCCRapInfoBox() extends FullBox(`vpra', version = 0, 0) {
  unsigned int(32)  entry_count;
  for (i=0; i < entry_conunt; i++){
    unsigned int(32)  sample_number;
    unsigned int(32)  total_distance;
    unsigned int(32)  num_entities_in_group;
    for (j=0; j < num_entities_in_group; j++) {
      unsigned int(1)  is_DTS¥aligned;
      unsigned int(1)  is_all_RAP;
      unsigned int(6)  reserved = 0;
      if (!is_all_RAP){
        unsigned int(8) sample_offset;
          if (is_non_RAP)
            unsigned int(16) distance;
      }
    }
  }
}
```

INFORMATION PROCESSING APPARATUS, REPRODUCTION PROCESSING APPARATUS, INFORMATION PROCESSING METHOD, AND REPRODUCTION PROCESSING METHOD

CROSS-REFERENCE TO RELATED APPLICATIONS

The present application is based on PCT filing PCT/JP2020/001273, filed Jan. 16, 2020, which claims priority to U.S. Provisional Patent Application No. 62/816,631, filed Mar. 11, 2019, the entire contents of each are incorporated herein by reference.

TECHNICAL FIELD

The present disclosure relates to an information processing apparatus, a reproduction processing apparatus, an information processing method, and a reproduction processing method.

BACKGROUND ART

In recent years, moving picture experts group-dynamic adaptive streaming over hypertext transfer protocol (MPEG-DASH) and other protocols are starting to spread as basic technology for streaming services on the Internet. Meanwhile, used in streaming using MPEG-DASH is, for example, technology for storing video data or audio data in an International Organization for Standardization base media file format (ISOBMFF) file and distributing the data. Here, ISOBMFF is standards of the MPEG-4 file format.

Meanwhile, MPEG-I Part 5 video-based point cloud compression (ISO/IEC 23090-5) specifies the compression methods of a point cloud which is a set of points that have both position information and attribute information (especially color information) in a three-dimensional space. As one of the compression methods, a point cloud is segmented into areas, and every area is projected in a plane to generate an attribute image (color information, etc.), a geometry image (including depth information), an occupancy image, and metadata (information for reconstructing the point cloud from a patch). The three images are encoded by a video codec, and a total of four streams (called component streams) are generated. This method is called video-based point cloud coding (V-PCC).

When a V-PCC content (video), which is a point cloud file that stores a point cloud encoded by this V-PCC in the ISOBMFF, is reproduced, it is demanded to provide a viewing experience such as viewing, forwarding, or rewinding from a desired part of the content in order to satisfy viewer's requests like in two-dimensional (2D) videos. Random access is a method for achieving the provision of these viewing experiences. In a case where the ISOBMFF is used, a file generating apparatus implements random access by providing information for identifying random access points (RAPs), which are a randomly accessible parts of streams, to a client apparatus.

CITATION LIST

Non-Patent Document

Non-Patent Document 1: "ISO/IEC 14496-12", Fifth Edition, 2015 Dec., 15

SUMMARY OF THE INVENTION

Problems to be Solved by the Invention

However, there are cases where an ISOBMFF content file includes tracks that individually store multiple component streams, such as a first stream, a second stream, a third stream, and a fourth stream, for example, like a V-PCC content. In a case of randomly accessing the content of such an ISOBMFF content file, random access point (RAP) identification is performed on each component stream on the decoder side, which results in large overhead.

Therefore, the present disclosure provides an information processing apparatus, a reproduction processing apparatus, an information processing method, and a reproduction processing method that can easily provide a viewing experience that meets the needs of a viewer.

Solutions to Problems

According to the present disclosure, a data acquiring unit acquires a content including a plurality of component streams. A file generating unit generates content RAP information indicating random access points of the content on the basis of random access point information of each of the component streams of the content that has been acquired by the data acquiring unit.

BRIEF DESCRIPTION OF DRAWINGS

FIG. 4 is a diagram illustrating an example of syntax in which RAP information of a V-PCC content according to the first embodiment is stored.

FIG. 9 is a diagram illustrating an example of syntax in which RAP information of a V-PCC content according to the second embodiment is stored.

FIG. 12 is a diagram illustrating an example of syntax in which RAP information of a V-PCC content according to Modification 2 of the second embodiment is stored.

FIG. 14 is a diagram illustrating an example of syntax in which RAP information of a V-PCC content according to Modification 3 of the second embodiment is stored.

FIG. 16 is a diagram illustrating an example of syntax in which RAP information of a V-PCC content according to the third embodiment is stored.

FIG. 17 is a diagram illustrating an example of syntax in which RAP information of a V-PCC content according to a fourth embodiment is stored.

MODE FOR CARRYING OUT THE INVENTION

Figure 1:
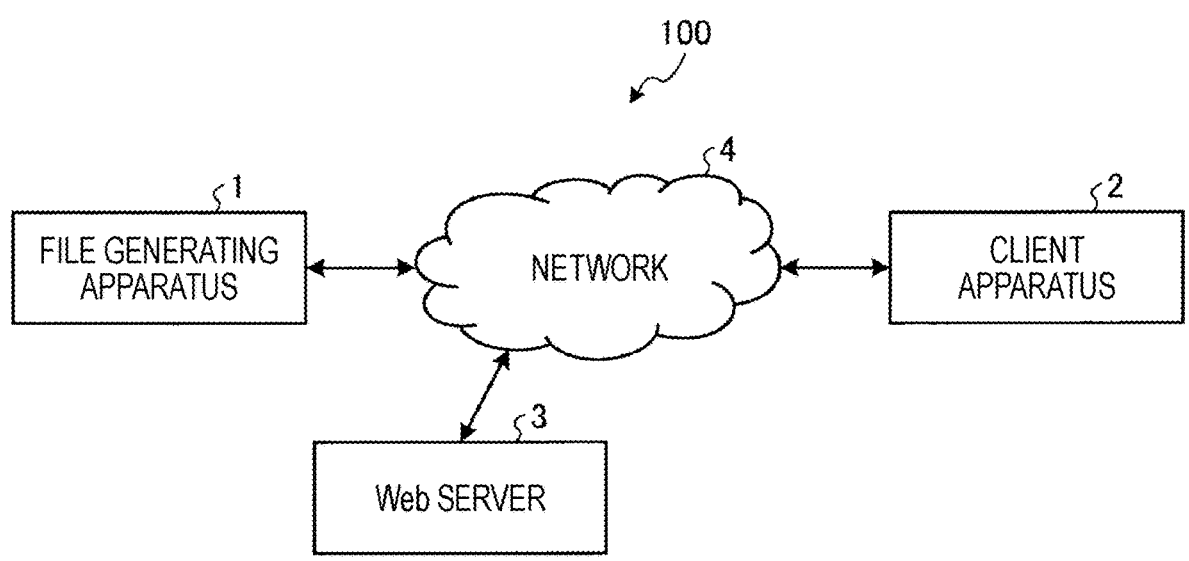
FIG. 1 is a system configuration diagram of an example of a distribution system.

Hereinafter, embodiments of an information processing apparatus, a reproduction processing apparatus, an information processing method, and a reproduction processing method disclosed in the present application will be described in detail on the basis of the drawings. Note that the scope disclosed in the present technology includes not only the content described in the embodiments but also the content described in the following non-patent documents that are known at the time of filing.

Non-Patent Document 1: (as mentioned above)
Non-Patent Document 2: "N18059", WD of Storage of V-PCC in ISOBMFF Files, 124th MPEG meeting, October 2018, Macau, Macao S.A.R., China.
Non-Patent Document 3: "N18180", Study text of ISO/IEC CD 23090-5 video based Point Cloud Compression, 125th MPEG meeting, January 2019, Marrakesh, Morocco.

That is, the content described in the above non-patent documents also forms the basis for determination of support requirements. For example, even in a case where terms used in a file structure described in Non-Patent Document 1 or a file structure of video codec based point cloud compression (V-PCC) described in Non-Patent Document 2 are not directly defined in the embodiments, it is deemed that those terms are within the scope of disclosure of the present technology and shall meet the support requirements of the scope of the claims.

Likewise, technical terms such as parsing, syntax, and semantics are also within the scope of the present technology, even in a case where they are not directly defined in the embodiments and shall meet the support requirements of the scope of the claims.

Note that the present disclosure will be described in the order of the items listed below.
1. First Embodiment
2. Second Embodiment
2.1 Modification 1 of Second Embodiment
2.2 Modification 2 of Second Embodiment
2.3 Modification 3 of Second Embodiment
3. Third Embodiment
4. Fourth Embodiment
5. Fifth Embodiment

1. First Embodiment

System Configuration According to First Embodiment

In a case where an ISOBMFF is used, a file generating apparatus provides information for identifying RAPS, which are randomly accessible samples, to a reproduction processing apparatus, thereby achieving viewing experiences such as viewing from a desired part of the content, fast forwarding, or rewinding. Here, a sample refers to the minimum access unit of movie data. A sample corresponds to one frame in movie data and is also a unit of decoding. There are two types of RAP: sync sample and open random-access sample.

A sync sample is a RAP that enables correct decoding of samples that follow that sample in a decoding order in a case where decoding is started from that sample. The information of a sync sample is stored, for example, in SyncSampleBox, TrackFragmentRunBox, and TrackFragmentRandomAccessBox. On the other hand, in an open random-access sample, in a case where decoding is started from that sample, there is a sample that cannot be correctly decoded among the samples that follow the sample in a decoding order. A sample that cannot be decoded correctly is, for example, a bi-predictional picture. The information of an open random-access sample is stored, for example, in a random access point sample group.

A point cloud file in which a point cloud encoded by V-PCC is stored in an ISOBMFF is called a V-PCC content. In a case where a V-PCC content is viewed, it is demanded to provide viewing experiences such as viewing from a desired part of the content, forwarding, or rewinding like in two-dimensional (2D) videos. A V-PCC content is configured as a single ISOBMFF file in which four component streams of attribute, geometry, occupancy, and metadata are stored on four separate tracks. The attribute, geometry, and occupancy are encoded by a video codec. The metadata has a patch sequence and a sequence parameter set.

In order to identify a RAP of a V-PCC content, a reproduction processing apparatus identifies RAPS in the respective tracks of attribute, geometry, occupancy, and metadata and then searches for a sample at decoding time when all the four tracks are RAPS. Note that in a case where there is a component stream that has no RAP at the time of random access, it is difficult for the reproduction processing apparatus to completely configure the V-PCC content at that time at the time of random access.

As described above, there is a large overhead in the process in which a reproduction processing apparatus performs identification of RAPS and detection of a sample at the decoding time. Therefore, the start of reproduction is delayed, which adversely affects the user experience.

Note that there is a similar disadvantage not only in a V-PCC content but also in random access to such multiple tracks that include a video track and an audio track that are reproduced simultaneously. In a V-PCC content, the disadvantage is significant since the overhead is larger due to the random access reproduction process of multiple video components. Therefore, in the present embodiment, a file generating apparatus and a client apparatus as the followings are provided.

FIG. 1 is a system configuration diagram of an example of a distribution system. A distribution system 100 includes a file generating apparatus 1 which is an information processing apparatus, a client apparatus 2 which is a reproduction processing apparatus, and a web server 3. The file generating apparatus 1, the client apparatus 2, and the web server 3 are connected to a network 4. The file generating apparatus 1, the client apparatus 2, and the web server 3 can communicate with each other via the network 4. Here, although a single piece of apparatus is illustrated for each of the apparatuses in FIG. 1, the distribution system 100 may include a plurality of file generating apparatuses 1 and a plurality of client apparatuses 2.

The file generating apparatus 1 generates a V-PCC content. The file generating apparatus 1 uploads the generated V-PCC content to the web server 3. Here, in the present embodiment, the configuration in which the web server 3 provides the V-PCC content to the client apparatus 2 will be described; however, the distribution system 100 may adopt another configuration. For example, the file generating apparatus 1 may include the functions of the web server 3, store the generated V-PCC content in the file generating apparatus 1 itself, and provide the V-PCC content to the client apparatus 2.

The web server 3 holds the V-PCC content uploaded from the file generating apparatus 1. Then, the web server 3 provides specified V-PCC content in accordance with a request from the client apparatus 2.

The client apparatus 2 transmits a transmission request for the V-PCC content to the web server 3. Then, the client apparatus 2 acquires the V-PCC content specified in the transmission request from the web server 3. Then, the client apparatus 2 decodes the V-PCC content to generate a movie and displays the movie on a display device such as a monitor.

Configuration of File Generating Apparatus According to First Embodiment

Figure 2:
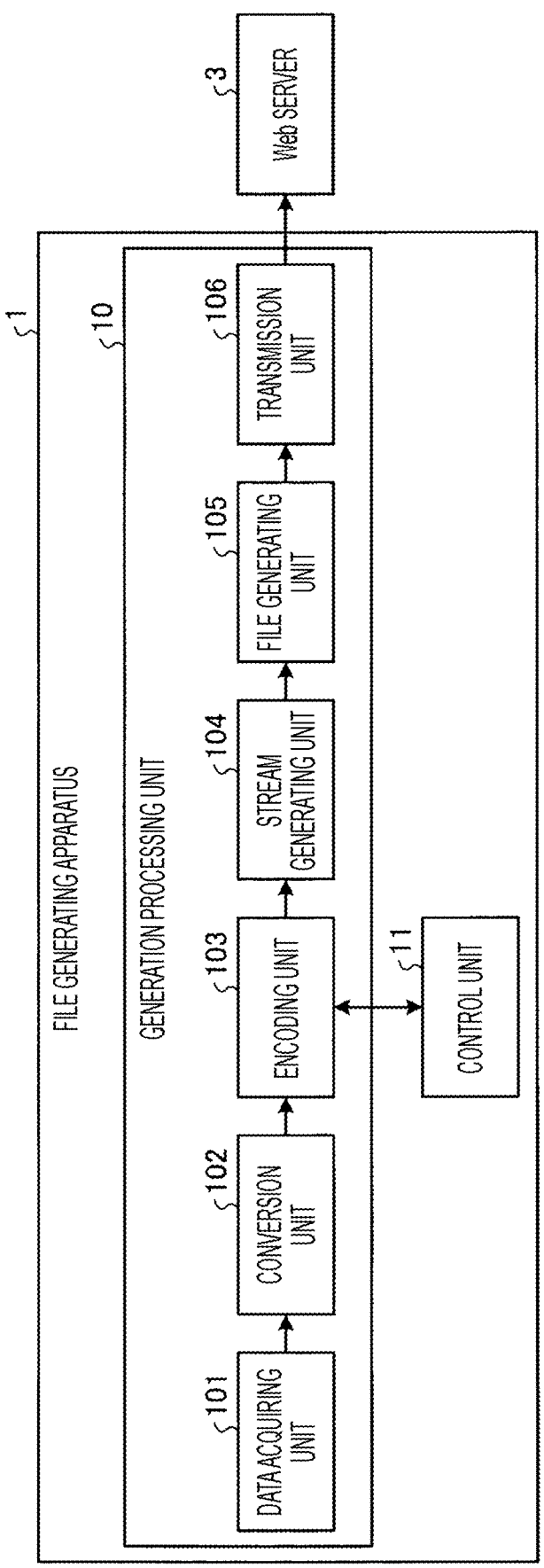
FIG. 2 is a block diagram of a file generating apparatus.

Next, details of the file generating apparatus 1 will be described. FIG. 2 is a block diagram of the file generating apparatus. As illustrated in FIG. 2, the file generating apparatus 1 which is an information processing apparatus includes a generation processing unit 10 and a control unit 11. The control unit 11 executes a process related to the control of the generation processing unit 10. For example, the control unit 11 performs integrated control such as the operation timing of each unit of the generation processing unit 10. The generation processing unit 10 includes a data acquiring unit 101, a conversion unit 102, an encoding unit 103, a stream generating unit 104, a file generating unit 105, and a transmission unit 106.

The data acquiring unit 101 accepts input of point cloud data. The data acquiring unit 101 outputs the acquired point cloud data to the conversion unit 102.

The conversion unit 102 receives the input of the point cloud data from the data acquiring unit 101. Then, the conversion unit 102 converts the data of three-dimensional point cloud into two-dimensional data for screen display and generates an attribute image, a geometry image, an occupancy image, and metadata. Metadata is sometimes referred to as patch sequence data. Then, the conversion unit 102 outputs the generated two-dimensional data to the encoding unit 103.

The encoding unit 103 includes four encoders that each correspond to an attribute image, a geometry image, an occupancy image, and metadata. The encoding unit 103 receives, from the conversion unit 102, input of the point cloud data that has been converted into the two-dimensional data. Then, the encoding unit 103 encodes the point cloud data to generate respective components of the attribute image, the geometry image, the occupancy image, and the metadata. In the following, each of the components will be referred to as an attribute, geometry, occupancy, or metadata component.

Figure 3:
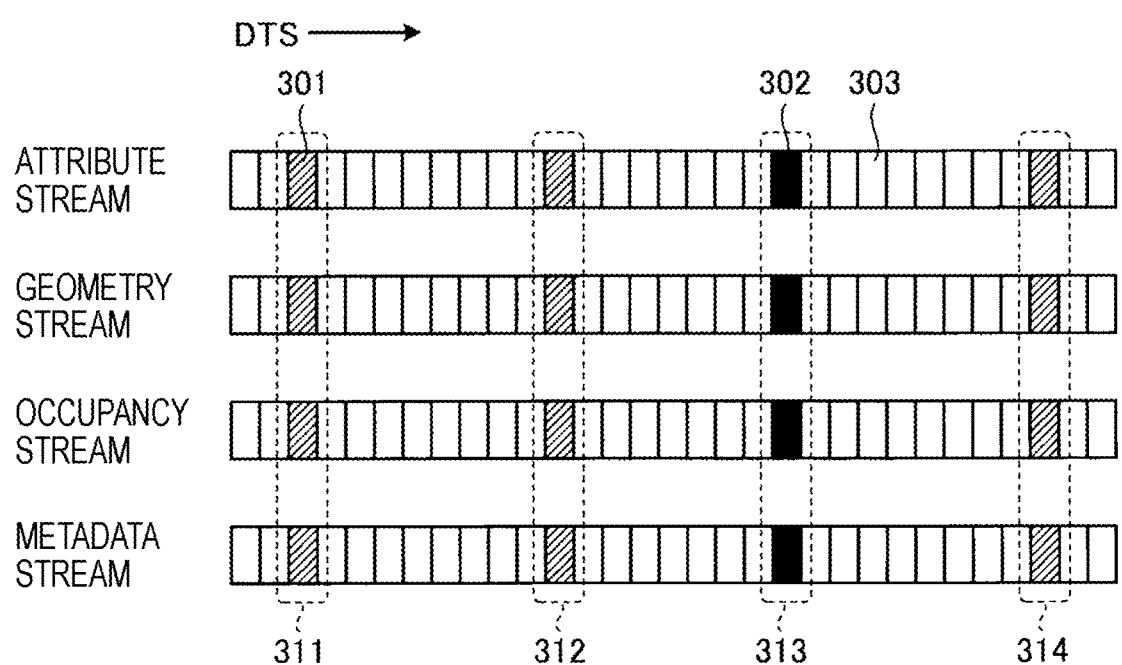
FIG. 3 is a diagram illustrating an encoding state in a first embodiment.

At this time, the encoding unit 103 performs encoding so that the encoding structures of the respective component streams of attribute, geometry, occupancy, and metadata are the same. More specifically, as illustrated in FIG. 3, the encoding unit 103 performs encoding so that decoding time stamps (DTSs) and composition time stamp (CTSs) of a sync sample and an open random-access sample of the respective components are the same. FIG. 3 is a diagram illustrating an encoding state in the first embodiment. A DTS indicates time when a movie is decoded. Meanwhile, a CTS indicates time when the movie is actually displayed.

In FIG. 3, a sample 301 with a diagonal pattern corresponds to the RAPS of a sync sample. Meanwhile, a solid-filled sample 302 corresponds to the RAPS of an open random-access sample. A sample 303 with no other pattern is a non-RAP sample other than the RAPS. Moreover, the sample groups 311, 312, and 314 include RAPS of sync samples of attribute, geometry, occupancy, and metadata at the same DTSs, which provides RAPS that allow the V-PCC to be completely reproduced. Meanwhile, the sample group 313 includes RAPS of open random-access samples of attribute, geometry, occupancy, and metadata at the same DTS. In the following, random access points that enable reproduction of V-PCC content are referred to as V-PCC content RAPS.

By the above-mentioned encoding, the positions of the sync samples and the open random-access sample in the respective components become the same, and RAP information of the respective tracks indicates the RAPS of the entire V-PCC content. That is, by specifying a RAP of one of the components, the RAPS of the remaining components are also specified. By making the DTSs and CTSs the same, it becomes possible to perform decoding at the same timing and to completely reproduce the V-PCC content by the data decoded at the same timing. The encoding unit 103 outputs the four types of components that have been generated to the stream generating unit 104.

The stream generating unit 104 receives input of the respective components of attribute, geometry, occupancy, and metadata from the encoding unit 103. Then, the stream generating unit 104 arranges samples of the respective components and generates component streams for the respective components of attribute, geometry, occupancy, and metadata. Then, the stream generating unit 104 outputs the four component streams that have been generated to the file generating unit 105.

The file generating unit 105 receives input of the respective component streams of the respective components of attribute, geometry, occupancy, and metadata from the stream generating unit 104. Then, the file generating unit 105 creates a file for every segment from the respective component streams that have been acquired and generates segment files of the component streams.

Then, the file generating unit 105 stores the segment files of the four component streams that have been generated in an ISOBMFF. At this time, the file generating unit 105 extends the VPCCGroupBox in order to make it clear that the encoding structures of the four component streams are the same and that the encoding is performed so that the RAPS are aligned and adds a flag indicating that the RAPS of the four component streams are aligned. The flag that indicates that the VPCCGroupBox has been extended and that the RAPS of the four component streams are aligned can be regarded as the RAP information of the V-PCC. That is, the file generating unit 105 stores the RAP information of V-PCC.

In the present embodiment, the file generating unit 105 extends the VPCCGroupBox stored in the metadata track and indicates whether or not the RAPS of the four component streams are aligned. Here, the VPCCGroupBox of the metadata track is extended in this embodiment; however, a VPCCGroupBox is not limited thereto, and the file generating unit 105 may extend a VPCCGroupBox of any track of the other three component streams. Here, the file generating unit 105 stores the RAP information of the respective component streams by using the existing method of storing in an ISOBMFF.

FIG. 4 is a diagram illustrating an example of syntax in which the RAP information of the V-PCC content according to the first embodiment is stored. The file generating unit 105 generates, for example, syntax 320 of an extended VPCC-GroupBox illustrated in FIG. 4. With lines 321 in FIG. 4, it is indicated whether or not the RAPS of the four component streams are aligned. In the present embodiment, the file generating unit 105 sets the value of rap_aligned to 1 in a case where the RAPS of the respective component streams are aligned and the RAP information of the respective tracks indicates the RAP information of the V-PCC content. On the other hand, in a case where the RAPS of the respective component streams are not aligned, the file generating unit 105 sets the value of rap_aligned to 0.

Note that a SampleEntry of the metadata track may be extended instead of the VPCCGroupBox to indicate whether or not the RAPS of the four component streams are aligned.

Then, the file generating unit 105 outputs the ISOBMFF file in which the segment files of the respective component streams are stored to the transmission unit 106. Then, an IBMFF file including the extended VPCCGroupBox generated by the file generating unit 105 corresponds to an example of "a content file in which the content RAP information is stored in a metadata area of the file".

The transmission unit 106 receives input of the ISOBMFF file, in which the segment files of the respective component streams are stored, from the file generating unit 105. Then, the transmission unit 106 transmits the ISOBMFF file in which the segment files of the respective component streams that has been acquired are stored to the web server 3 and uploads the V-PCC content.

Configuration of Client Apparatus According to First Embodiment

Figure 5:
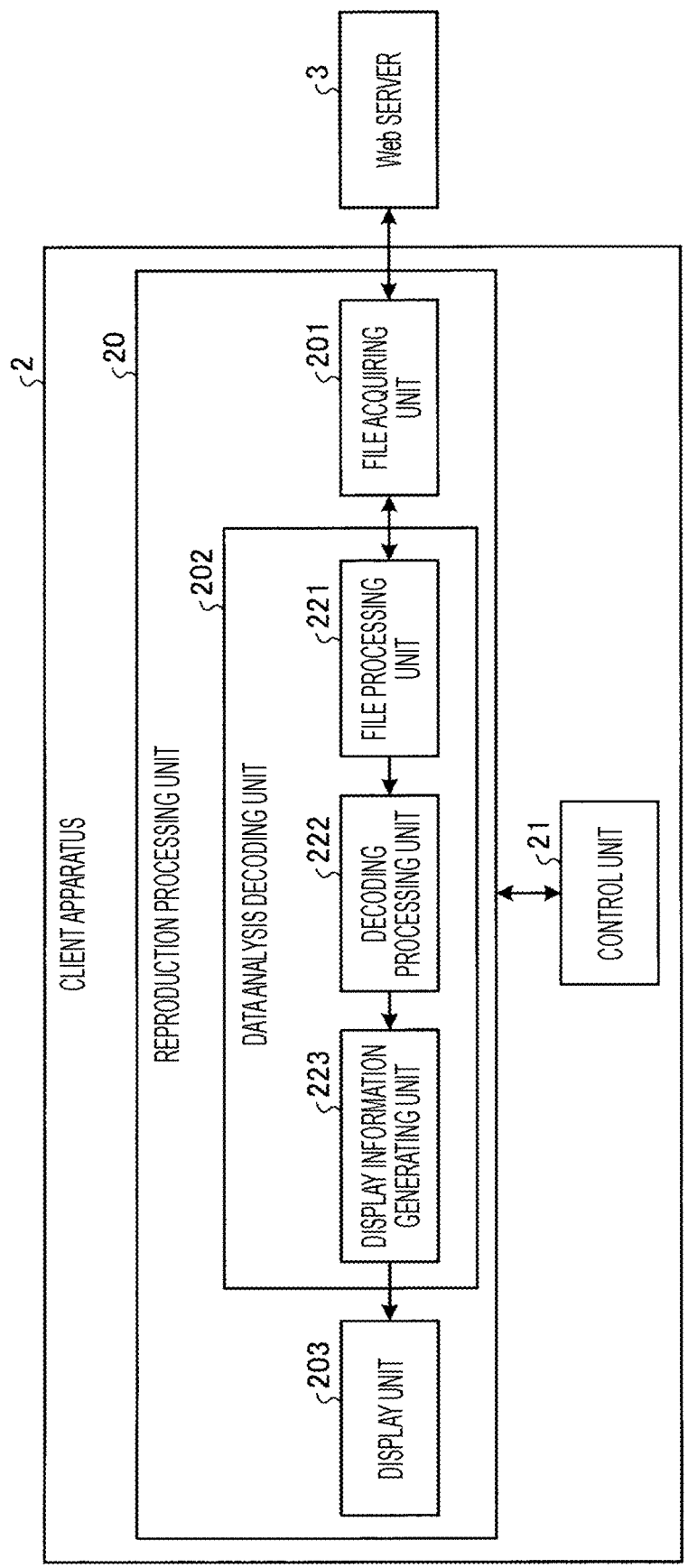
FIG. 5 is a block diagram of a client apparatus.

FIG. 5 is a block diagram of the client apparatus. As illustrated in FIG. 5, the client apparatus 2 which is a reproduction processing apparatus includes a reproduction processing unit 20 and a control unit 21. The control unit 21 controls the operation of each unit of the reproduction processing unit 20. For example, the control unit 21 comprehensively controls the operation timing of each unit of the reproduction processing unit 20. The reproduction processing unit 20 includes a file acquiring unit 201, a data analysis and decoding unit 202, and a display unit 203.

The file acquiring unit 206 acquires a media presentation description (MPD) file that corresponds to the V-PCC content to be reproduced from the web server 3. The MPD file contains information of the storage location of the data of the V-PCC content or information regarding movie reproduction such as the encoding speed or the image size. Then, the file acquiring unit 206 outputs the acquired MPD file to the file processing unit 221. Then, the file acquiring unit 201 receives the input of the information of the storage location of the data of the V-PCC content to be reproduced from the file processing unit 221.

The file acquiring unit 201 makes an acquisition request for the data of the V-PCC content to the web server 3 by using the acquired information of the storage location of the data of the V-PCC content. Then, the file acquiring unit 201 acquires the ISOBMFF file in which the segment files of the respective component streams of the data of the V-PCC content are stored. Then, the file acquiring unit 201 outputs the ISOBMFF file, in which the segment files of the respective component streams of the data of the V-PCC content are stored, to the file processing unit 221 of the data analysis and decoding unit 202.

The data analysis and decoding unit 202 executes analysis of an acquired file, an acquisition request of data based on the analysis result, decoding of data, and generation of display data. The data analysis and decoding unit 202 includes a file processing unit 221, a decoding processing unit 222, and a display information generating unit 223.

The file processing unit 221 receives the input of the MPD file from the file acquiring unit 201. Then, the file processing unit 221 parses the acquired MPD file and acquires the information of the storage location of the data of the V-PCC content to be reproduced from an adaptation set of the V-PCC content. Then, the file processing unit 221 transmits the information of the storage location of the data of the V-PCC content to the file acquiring unit 201 and makes an acquisition request of the data.

Then, the file processing unit 221 receives the input of the ISOBMFF file in which the segment files of the respective component streams of the data of the V-PCC content are stored from the file acquiring unit 201. Next, the file processing unit 221 parses the acquired ISOBMFF file. Then, the file processing unit 221 acquires data of the respective component streams of the data of the V-PCC content. The file processing unit 221 further confirms the flag included in the VPCCGroupBox in the metadata track from the parsed result of the ISOBMFF file. Then, the file processing unit 221 determines whether or not the RAPS of the four component streams of the V-PCC content are aligned. Then, the file processing unit 221 outputs the data of the respective component streams to the decoding processing unit 222. Furthermore, the file processing unit 221 notifies the decoding processing unit 222 of the determination result of whether or not the RAPS of the four component streams of the V-PCC content are aligned.

The decoding processing unit 222 receives the input of the data of the four component streams of the V-PCC content from the file processing unit 221. Furthermore, the decoding processing unit 222 receives, from the file processing unit 221, a notification of the determination result as to whether or not the RAPS of the four component streams of the V-PCC content are aligned.

The decoding processing unit 222 decodes the respective component streams of the V-PCC content. Then, in a case where the RAPS of the four component streams are aligned in random access, the decoding processing unit 222 acquires RAP information of one of the four component streams, specifies a sample of the RAPS, and decodes the respective component streams of the V-PCC content from the sample that has been identified.

On the other hand, in a case where the RAPS of the four component streams are not aligned, the decoding processing unit 222 identifies the RAPS of the respective component streams. Then, the decoding processing unit 222 specifies a sample of a DTS at which RAP positions of all the component streams match. Then, the decoding processing unit 222 decodes the respective component streams of the V-PCC content from the sample that has been specified. Then, the decoding processing unit 222 outputs the data of the respective component streams of the V-PCC content that have been decoded to the display information generating unit 223.

The display information generating unit 223 receives the input of the data of the respective component streams of the V-PCC content from the decoding processing unit 222. Then, the display information generating unit 223 configures a point cloud using the information of the respective component streams of the V-PCC content, performs rendering, and generates display information. Then, the display information generating unit 223 outputs the display information to the display unit 203.

The display unit 203 includes a display device such as a speaker or a monitor. The display unit 203 receives input of audio and images to be displayed that are generated by the display information generating unit 223 of the data analysis and decoding unit 202. Then, the display unit 203 causes the display device to display the audio and the images to be displayed that have been acquired.

File Generation Procedure According to First Embodiment

Next, by referring to FIG. 6, the flow of the file generation process by the file generating apparatus 1 according to the first embodiment will be described.

Figure 6:
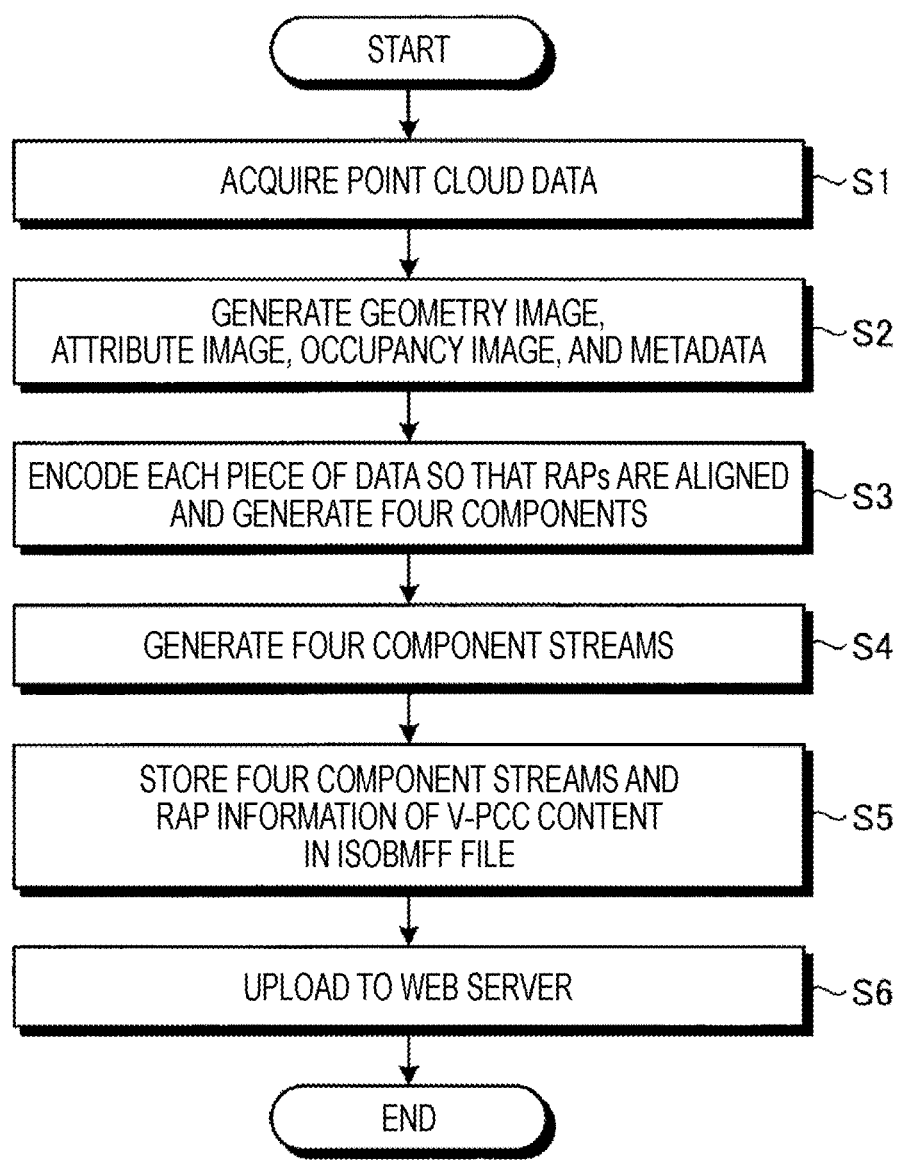
FIG. 6 is a flowchart of a file generation process by a file generating apparatus according to the first embodiment.

FIG. 6 is a flowchart of the file generation process by the file generating apparatus according to the first embodiment.

The data acquiring unit 101 acquires point cloud data (step S1). Then, the data acquiring unit 101 outputs the acquired point cloud data to the conversion unit 102.

The conversion unit 102 receives the input of the point cloud data from the data acquiring unit 101. Then, the conversion unit 102 converts the three-dimensional data of the acquired point cloud data into two-dimensional data and generates a geometry image, an attribute image, an occupancy image, and metadata (step S2). Then, the conversion unit 102 outputs the geometry image, the attribute image, the occupancy image, and the metadata to the encoding unit 103.

The encoding unit 103 receives the input of the geometry image, the attribute image, the occupancy image, and the metadata from the conversion unit 102. Then, the encoding unit 103 performs encoding so that the RAPS of the respective pieces of data are aligned and generates components of the geometry, the attribute, the occupancy, and the metadata (step S3). Then, the encoding unit 103 outputs the four components that have been generated to the stream generating unit 104.

The stream generating unit 104 receives the inputs of the four components from the encoding unit 103. Then, the stream generating unit 104 arrays samples of the respective components to generate four component streams (step S4). Then, the stream generating unit 104 outputs the four component streams that have been generated to the file generating unit 105.

The file generating unit 105 receives the input of the four component streams from the stream generating unit 104. Then, the file generating unit 105 stores the four component streams and RAP information of the V-PCC content in an ISOBMFF file (step S5). Then, the file generating unit 105 outputs the generated ISOBMFF file to the transmission unit 106.

The transmission unit 106 receives the input of the ISOBMFF file in which the four component streams are stored from the file generating unit 105. Then, the transmission unit 106 transmits the acquired ISOBMFF file to the web server 3 and uploads the V-PCC content (step S6).

Reproduction Process Procedure According to First Embodiment

Figure 7:
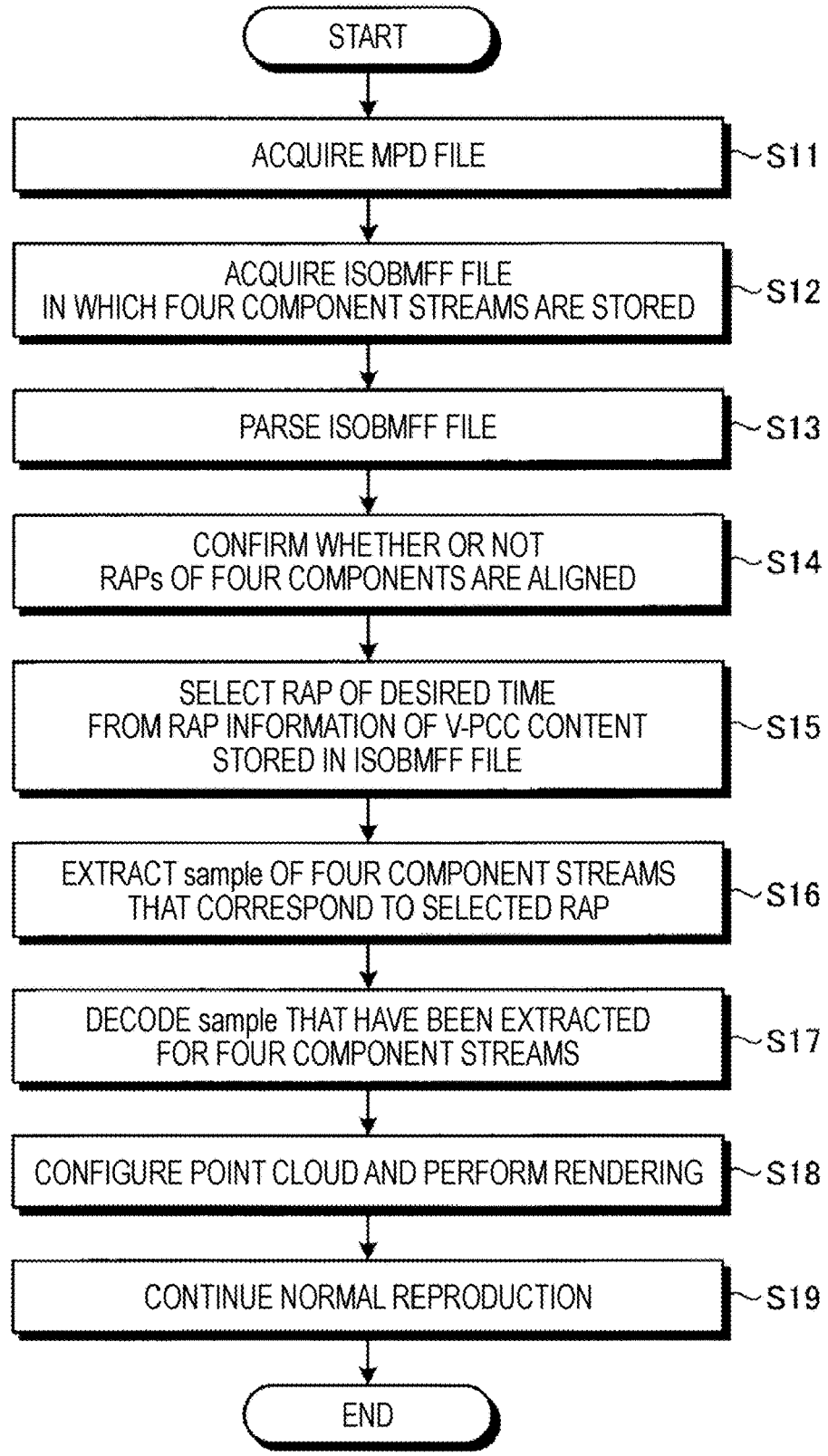
FIG. 7 is a flowchart of a reproduction process executed by the client apparatus according to the first embodiment.

Next, the flow of the reproduction process executed by the client apparatus 2 according to the present embodiment will be described by referring to FIG. 7. FIG. 7 is a flowchart of the reproduction process executed by the client apparatus according to the first embodiment.

The file acquiring unit 201 transmits an acquisition request for V-PCC content to the web server 3 and acquires an MPD file of the V-PCC content that has been specified (step S11). Then, the file acquiring unit 201 outputs the MPD file to the file processing unit 221. The file processing unit 221 parses the MPD file, acquires storage location information of the data of the V-PCC content to be reproduced, and notifies the file acquiring unit 201 of the storage location information.

The file acquiring unit 201 receives, from the file processing unit 221, a notification of the storage location information of the data of the V-PCC content to be reproduced. Then, the file acquiring unit 201 transmits, to the web server 3, an acquisition request for the data of the storage location specified in the storage location information that has been acquired. Then, the file acquiring unit 201 acquires an ISOBMFF file, in which the four component streams of the V-PCC content to be reproduced are stored, from the web server 3 (step S12). The file acquiring unit 201 outputs the acquired ISOBMFF file to the file processing unit 221.

The file processing unit 221 receives the input of the ISOBMFF file, in which the four component streams are stored, from the file acquiring unit 201. Then, the file processing unit 221 parses the acquired ISOBMFF file (step S13).

Next, the file processing unit 221 acquires RAP information from a VPCCGroupBox of the metadata track and determines whether or not the RAPS of the four component streams are aligned (step S14). Here, a case where the RAPS of the four component streams are aligned will be described. Then, the file processing unit 221 outputs, to the decoding processing unit 222, the data of the four component streams and the information that the RAPS of the four component streams are aligned.

The decoding processing unit 222 selects RAPS at desired time from the RAP information of the V-PCC content stored in the ISOBMFF file (step S15).

Next, the decoding processing unit 222 extracts a sample of the four component streams that corresponds to the selected RAPS (step S16).

Next, the decoding processing unit 222 decodes the sample extracted for the four component streams (step S17). The decoding processing unit 222 outputs the decoded sample to the display information generating unit 223.

The display information generating unit 223 configures a point cloud from the decoded sample and further executes rendering to generate a display image (step S18). Then, the display information generating unit 223 transmits the generated display image to the display unit 203 and causes the display unit 203 to display the display image.

Then, the display information generating unit 223 continues the normal reproduction (step S19).

As described above, the file generating apparatus according to the present embodiment performs encoding so that the time of respective random access points of a plurality of streams included in content match. As a result, by identifying a random access point of any one of the streams, it is possible to identify random access points of content in which random access points of all the streams included in the content match. Therefore, it is possible to easily select random access points of the content and to reduce the overhead in the random access. It is possible to easily implement. By achieving a prompt random access in this manner, it becomes possible to easily provide a viewing experience that meets the needs of a viewer.

2. Second Embodiment

Next, a second embodiment will be described. In a case of restricting encoding so that RAPS of the respective component streams are the same as in the first embodiment, there is a possibility that the encoding efficiency may be deteriorated since images are different for every component stream.

Therefore, a file generating apparatus according to the present embodiment is different from the first embodiment in that a location, where the same RAP is used in respective component streams, is used as RAPS of the content without restricting the encoding structure. A file generating apparatus 1 and a client apparatus 2 according to the present embodiment are also represented by the block diagrams of FIGS. 2 and 5. In the following description, description of a function of each unit that is similar to that of the first embodiment will be omitted.

Figure 8:
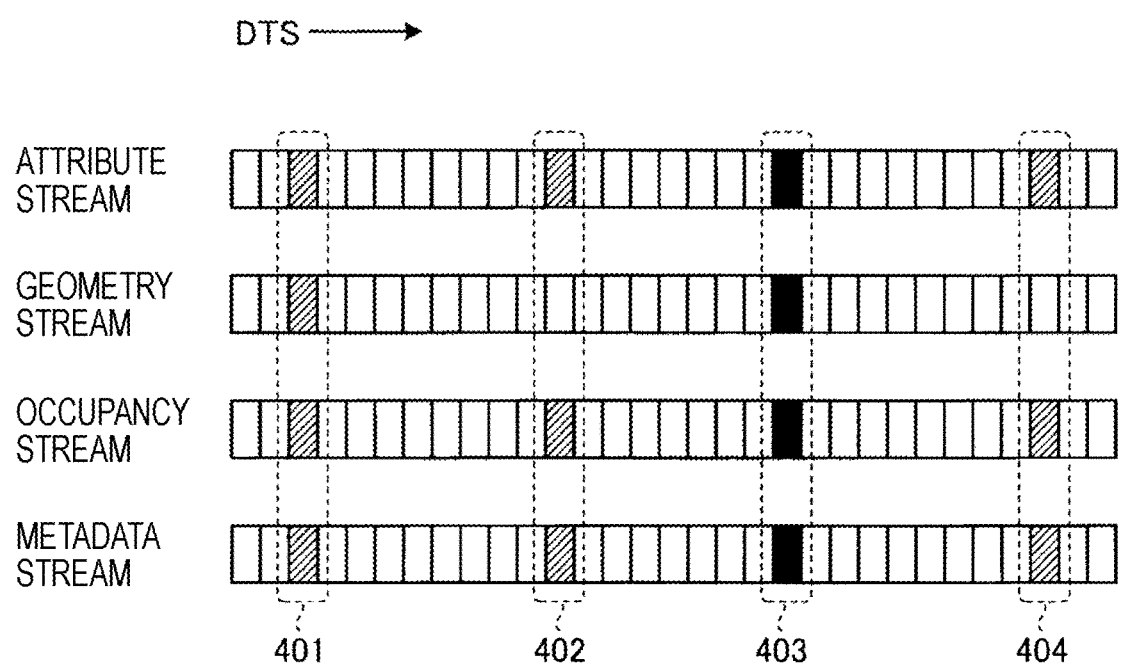
FIG. 8 is a diagram illustrating an encoding state in a second embodiment.

The encoding unit 103 of the file generating apparatus 1 according to the present embodiment sets the same CTS and the same DTS for RAPS if the RAPS can be arranged in the respective component streams but determines the type of a RAP for every component. The encoding unit 103 encodes each of the components, for example, as illustrated in FIG. 8. FIG. 8 is a diagram illustrating an encoding state in the second embodiment. In FIG. 8, a shaded sample represents a RAP of a sync sample, and a solid-filled sample represents a RAP of an open random-access sample. For example, in a sample group 401, samples of all the four component streams are RAPS of sync samples at the same DTS. Meanwhile, in a sample group 403, samples of all the four component streams are RAPS of open random-access samples at the same DTS. On the other hand, in a sample group 402 and a sample group 404, there are no RAPS of sync samples in the geometry stream at the same DTS since the encoding structure is not restricted. In this case, the sample group 401 and the sample group 403 can be used as RAPS of a V-PCC content.

The file generating unit 105 uses samples having the same type of RAP in the four component streams as RAPS of the V-PCC content. Then, the file generating unit 105 stores the RAP information of the V-PCC content in a VPCCGroupBox of the metadata track which is an entry point of the V-PCC content. Specifically, the file generating unit 105 extends the VPCCGroupBox and adds a flag clearly indicating that the RAP information stored in the metadata track is RAP information of the V-PCC content that satisfies the condition that is the RAPS are of the same type in the four component streams. Here, the file generating unit 105 stores the RAP information of the respective component streams by using the existing method of storing in an ISOBMFF.

FIG. 9 is a diagram illustrating an example of syntax in which the RAP information of the V-PCC content according to the second embodiment is stored. The file generating unit 105 generates, for example, syntax 410 of an extended VPCCGroupBox illustrated in FIG. 4. The file generating unit 105 indicates whether or not the RAP information stored in the metadata track indicates the RAP information of the V-PCC content by lines 411 in the syntax 410. In the present embodiment, the file generating unit 105 sets the value of rap_aligned to 1 in a case where RAP information of the metadata track indicates the RAP information of the V-PCC content. On the contrary, when the RAP information of the metadata track does not indicate the RAP information of the V-PCC content, the file generating unit 105 sets the value of rap_aligned to 0.

Note that SampleEntry of the metadata track may be extended instead of extending the VPCCGroupBox for indicating whether or not the RAP information stored in the metadata track indicates the RAP information of the V-PCC content.

Here, in this embodiment, the RAP information of the V-PCC content is indicated by using the RAP information of the metadata track; however, the RAP information of the V-PCC content may be indicated by using RAP information of another component stream. In that case, the file generating unit 105 generates a file that clearly specifies the component stream storing the RAP of the V-PCC content.

The file processing unit 221 of the client apparatus 2 parses the ISOBMFF file that has been acquired, checks a flag of the VPCCGroupBox of the metadata track, and determines whether or not the RAP of the metadata represents the RAP of the V-PCC content.

When performing random access, the decoding processing unit 222 specifies samples that correspond to the RAP of the metadata representing the RAP of the V-PCC content at a position specified as a random access point.

Then, the decoding processing unit 222 decodes the specified samples to generate the respective component streams.

As described above, the file generating apparatus according to the present embodiment sets the position, where RAPS of the same type are aligned in all the component streams, as RAPS of the content without restricting the encoding structure. As a result, it is possible to achieve a prompt random access while mitigating deterioration of the encoding efficiency and to easily provide a viewing experience that meets the needs of a viewer.

2.1 Modification 1 of Second Embodiment

In the present modification, a new Box is defined in order to store RAP information of a V-PCC content. A method of storing RAP information of a V-PCC content according to the present modification will be described below.

Figures 10, 11:
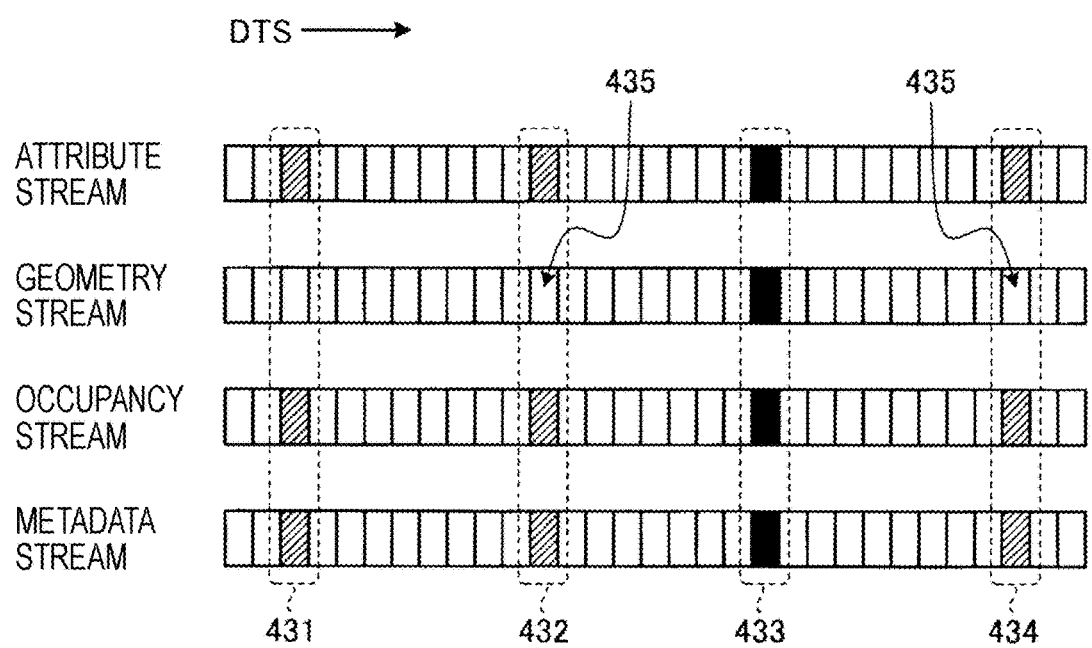
FIG. 10 is a diagram illustrating an example of syntax in which RAP information of a V-PCC content according to Modification 1 of the second embodiment is stored.
FIG. 11 is a diagram illustrating an encoding state in Modification 2 of the second embodiment.

The file generating unit 105 newly generates a VPCCRapInfoBox for storing the RAP information of the V-PCC content. FIG. 10 is a diagram illustrating an example of syntax in which the RAP information of the V-PCC content according to Modification 1 of the second embodiment is stored. For example, the file generating unit 105 generates a VPCCRapInfoBox having syntax 420 as illustrated in FIG. 10.

Here, entry_count indicates the number of RAPS of the V-PCC content. In addition, sample_number indicates the sample position of a RAP that is shared by the respective tracks including the RAPS of the V-PCC content. Here, the file generating unit 105 may specify an entry_id of a SyncSampleBox or a TrackFragmentRandomAccessBox instead of the sample_number.

Then, the file generating unit 105 disposes the VPCCRapInfoBox that has been generated, for example, under the VPCCGroupBox. Alternatively, the file generating unit 105 may dispose the VPCCRapInfoBox that has been generated under MovieFragmentBox(moof)/MetaDataBox(meta). In addition, the file generating unit 105 separately stores RAP information of the respective component streams in different tracks. In this case, the type of a RAP of the respective component streams may be different at the position specified as a RAP of the V-PCC content.

Furthermore, in addition to the VPCCRapInfoBox, the file generating unit 105 may define a sample group and indicate that a sample belonging to the group is a RAP of the V-PCC content.

The file processing unit 221 of the client apparatus 2 parses the ISOBMFF file and specifies a RAP of the V-PCC content from the VPCCRapInfoBox. The file processing unit 221 further checks a track in which RAP information of the respective component streams is stored and specifies the type of a RAP of each of the component streams in the specified RAPS of the V-PCC content. In a case where the types of the RAPS match, the file processing unit 221 achieves random access by notifying the decoding processing unit 222 of the specified RAP of the V-PCC content and causing the decoding processing unit 222 to perform decoding.

As explained above, it is possible to achieve random access by defining a new Box for storing the RAP information of the V-PCC content. With such a method, it is also possible to achieve a prompt random access while mitigating deterioration of the encoding efficiency and to easily provide a viewing experience that meets the needs of a viewer.

2.2 Modification 2 of Second Embodiment

In the present modification, even in a case where non-RAP samples are mixed, samples are regarded as RAPS of a V-PCC content, and the decoding start position is specified for the non-RAP samples. A method of storing RAP information of a V-PCC content according to the present modification will be described below.

The encoding unit 103 performs encoding as illustrated in FIG. 11 as in the second embodiment. FIG. 11 is a diagram illustrating an encoding state in Modification 2 of the second embodiment. In this case, in a sample group 431, samples of all the four component streams are RAPS of sync samples at the same DTS. Meanwhile, in a sample group 434, samples of all the four component streams are RAPS of open random-access samples at the same DTS. In contrast, a sample group 432 and a sample group 434 include non-RAP samples at the same DTS.

The file generating unit 105 deems samples, even at a DST at which non-RAP samples are mixed, as RAPS of the V-PCC content. Then, the file generating unit 105 newly generates a VPCCRapInfoBox for storing the RAP information of the V-PCC content. The file generating unit 105 further extends the newly generated VPCCRapInfoBox and specifies the decoding start position for decoding the non-RAP samples contained in the assumed RAPS of the V-PCC content.

For example, in a case where the sample group 432 and the sample group 434 in FIG. 11 are deemed as the V-PCC content, the file generating unit 105 specifies the decoding start position of the non-RAP sample 435 together with RAP information thereof.

FIG. 12 is a diagram illustrating an example of syntax in which the RAP information of the V-PCC content according to Modification 2 of the second embodiment is stored. The file generating unit 105 creates a VPCCRapInfoBox having syntax 440 as illustrated in FIG. 12 and disposes the VPCCRapInfoBox under, for example, the VPCCGroupBox.

If the value of is_all_RAP in the syntax 440 is 1, this indicates that all the samples of the respective component streams included in the RAPS of V-PCC content are RAPS. Meanwhile, if the value of is_all_RAP is 0, this indicates that there is a non-RAP sample among the samples of the respective component streams included in the RAPS of V-PCC content. In addition, num_entities_in_group indicates the number of component streams included in the V-PCC content. Moreover, num_entities_in_group identifies the type of a component stream indicated in the VPCC-GroupBox in the order of entry. Furthermore, if the value of is_non_RAP is 1, this means that the sample of the component stream is not a RAP. Meanwhile, if the value of is_non_RAP is 0, this means that the sample of the component stream is a RAP. In addition, distance indicates the difference in the number of samples to the decoding start position for decoding non-RAP samples. Here, the distance is an offset to a RAP position that is present preceding a RAP of the target V-PCC content in the component stream that has the non-RAP sample. The distance is obtained on the basis of the sample position indicated by the sample_number.

For example, at the decoding start position of a sample 435 in FIG. 11, the file generating unit 105 sets is_all_RAP to 1 to indicate that the sample 435 that is a non-RAP is included. The file generating unit 105 further sets the distance to 10 as decoding start position information for decoding the sample 435.

In addition to this, the file generating unit 105 may specify a component stream other than the metadata track in a loop of a num_entities_in_group in the syntax 440 of FIG. 12.

As described above, it is possible to achieve random access by regarding samples as RAPS of a V-PCC content even in a case where non-RAP samples are mixed and specifying the decoding start position for the non-RAP samples. In this case, the upper limit that can be specified as a RAP of a V-PCC content can be increased as compared with the case of Modification 1, and thus RAPS of the V-PCC content increase. Therefore, the random access can be refined, and it becomes possible to provide a viewing experience that meets the needs of a viewer.

2.3 Modification 3 of Second Embodiment

In the present modification, even in a case where a non-RAP sample is mixed, samples are regarded as RAPS of a V-PCC content, and reproduction is started using a component stream of samples other than the non-RAP sample at random access. A method of storing RAP information of a V-PCC content according to the present modification will be described below.

Figure 13:
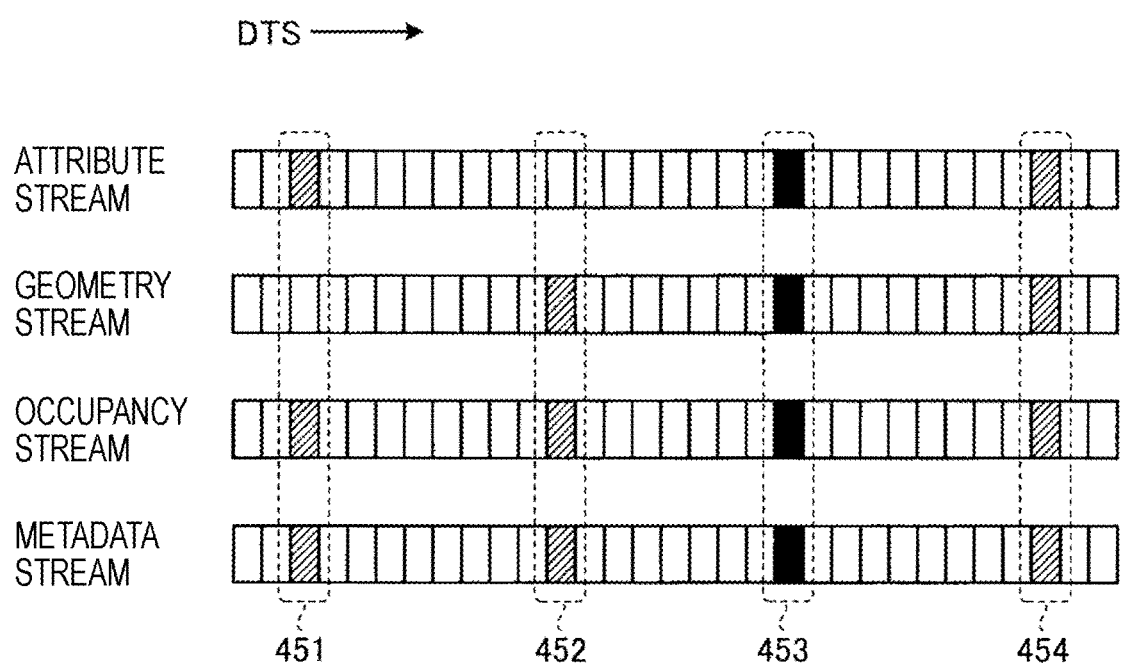
FIG. 13 is a diagram illustrating an encoding state in Modification 3 of the second embodiment.

The encoding unit 103 performs encoding as illustrated in FIG. 13 as in the second embodiment. FIG. 13 is a diagram illustrating an encoding state in Modification 3 of the second embodiment. In this case, in a sample group 451 and a sample group 454, samples of all the four component streams are RAPS of sync samples at the same DTS. Meanwhile, in a sample group 453, samples of all the four component streams are RAPS of open random-access samples at the same DTS. In contrast, a sample group 452 includes non-RAP samples in the component stream of the attribute.

The file generating unit 105 deems samples, even at a DST at which non-RAP samples are mixed, as RAPS of the V-PCC content. Then, the file generating unit 105 newly generates a VPCCRapinfoBox for storing the RAP information of the V-PCC content. The file generating unit 105 further extends the newly generated VPCCRapinfoBox and indicates a component stream having a non-RAP sample contained in the assumed RAPS of the V-PCC content as a component stream that does not need to be decoded. As a result, the file generating unit 105 indicates that, at the RAP of the V-PCC content, the client apparatus 2 may execute a process of displaying an image added with the component stream at the time when a next RAP of the component stream is reached.

For example, in a case where the sample group 452 in FIG. 13 is a V-PCC content, the file generating unit 105 generates information indicating that the component stream of the attribute is a component stream that does not need to be decoded at that time together with RAP information thereof.

FIG. 14 is a diagram illustrating an example of syntax in which the RAP information of the V-PCC content according to Modification 3 of the second embodiment is stored. The file generating unit 105 creates a VPCCRapinfoBox having syntax 460 as illustrated in FIG. 14 and disposes the VPCCRapinfoBox under, for example, the VPCCGroupBox. In the syntax 460, if the value of is_decode_optional is 1, it indicates that the component stream does not need to be decoded at the time of random access. Meanwhile, if the value of is_decode_optional is 0, it indicates that the component stream is to be decoded at the time of random access.

For example, in a case of randomly accessing samples of the sample group 452 in FIG. 13, the file generating unit 105 sets the value of is_decode_optional to 1 for the component stream of the attribute.

For example, in a case of random access to RAPS of the V-PCC content in the sample group 452 of FIG. 13, the file processing unit 221 of the client apparatus 2 parses the ISOBMFF and checks the VPCCRapinfoBox. Then, the file processing unit 221 instructs the decoding processing unit 222 not to decode a component stream having a value of 1 for is_decode_optional at that time. Then, the file processing unit 221 instructs the decoding processing unit 222 to decode all the four component streams when the movie to be reproduced reaches a RAP of the component stream of the attribute.

For example, in a case of random access to the RAPS of the V-PCC content in the sample group 452 of FIG. 13, the decoding processing unit 222 decodes samples included in the sample group 452 in the component streams of the geometry, the occupancy, and the metadata. Then, the decoding processing unit 222 outputs the decoded geometry, the occupancy, and the metadata samples to the display information generating unit 223. Then, the decoding processing unit 222 receives an instruction for decoding all the four component streams from the file processing unit 221 when the movie to be reproduced reaches a RAP of the component stream of the attribute. Then, from that point onward, the decoding processing unit 222 decodes samples of all the four component streams. The decoding processing unit 222 outputs the decoded samples of all the four component streams to the display information generating unit 223.

For example, in a case of random access to the RAPs of the V-PCC content in the sample group 452 of FIG. 13, the display information generating unit 223 receives input of composite samples of the geometry, the occupancy, and the metadata from the decoding processing unit 222. In this case, since coloring by the attribute is not performed, the display information generating unit 223 configures a colorless point cloud from the other three component streams and displays the point cloud on the display unit 203 as a display image. Then, from a point when the movie to be reproduced reaches a RAP of the component stream of the attribute and onward, the display information generating unit 223 receives input of samples of all the four component streams from the decoding processing unit 222. Then, the display information generating unit 223 configures a colored point cloud from that point on and displays the point cloud on the display unit 203 as a display image.

As described above, it is possible to achieve random access by regarding samples as RAPs of a V-PCC content even in a case where non-RAP samples are mixed and obtaining a movie from a next RAP for non-RAP samples. Also with such a configuration, the upper limit that can be specified as a RAP of a V-PCC content can be increased as compared with the case of Modification 1, and thus RAPS of the V-PCC content increase. Therefore, the random access can be refined, and it becomes possible to provide a viewing experience that meets the needs of a viewer.

3. Third Embodiment

Next, a third embodiment will be described. A file generating apparatus according to the present embodiment is different from the first and second embodiments in that there is no restriction that DTSs of samples that are RAPS of the respective component streams are matched. Note that a file generating apparatus 1 and a client apparatus 2 according to the present embodiment are also represented by the block diagrams of FIGS. 2 and 5. In the following description, description of a function of each unit that is similar to that of the first embodiment will be omitted.

The encoding unit 103 of the file generating apparatus 1 according to the present embodiment performs encoding on the condition that DTSs of samples, which are RAPS of the respective component streams, may be different. That is, the encoding unit 103 performs encoding with an encoding structure that is optimum for each of the component streams. In this case, there are cases where DTSs of samples that are RAPS in the respective component streams do not match.

Figure 15:
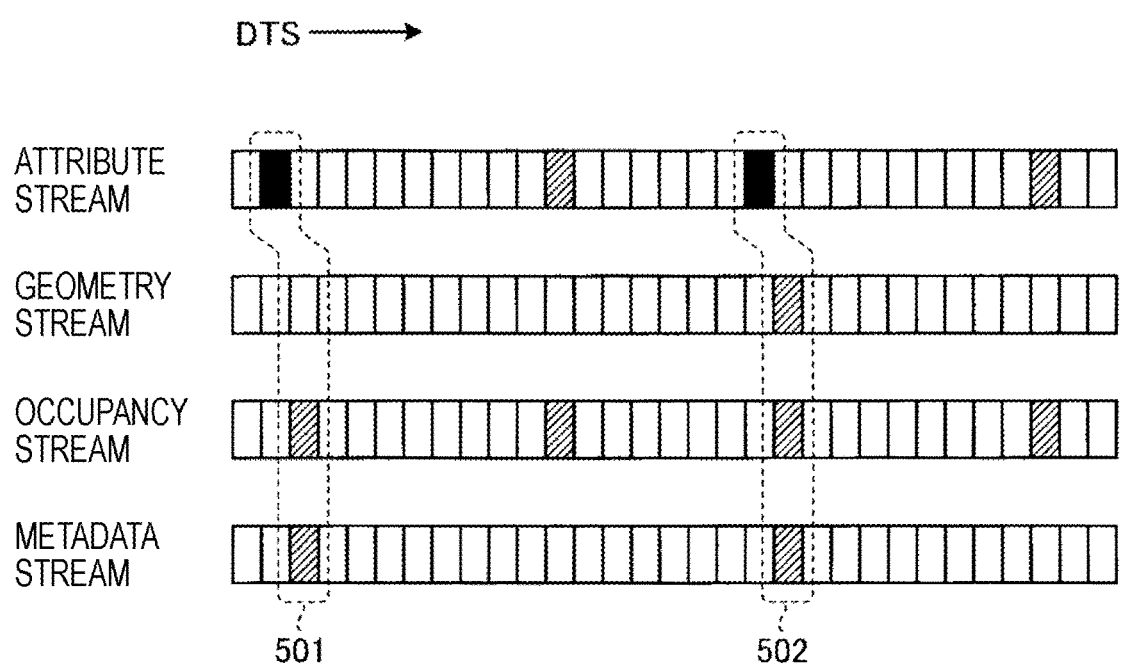
FIG. 15 is a diagram illustrating an encoding state in a third embodiment.

The encoding unit 103 encodes each of the components, for example, as illustrated in FIG. 15. FIG. 15 is a diagram illustrating an encoding state in the third embodiment. In FIG. 15, a shaded sample represents a RAP of a sync sample, and a solid-filled sample represents a RAP of an open random-access sample. For example, in a sample group 501 and a sample group 502, the DTS of samples that are RAPS of the attribute stream do not match.

The file generating unit 105 specifies RAPS having DTSs in close temporal proximity among the respective component streams. Being in close temporal proximity refers to a case where RAPS are present at DTSs within a specific range such as, for example, within three samples. In a case where there is a component stream in which there are no RAPS having DSTs in close temporal proximity, the file generating unit 105 determines that there are no RAPS for that component stream. Then, the file generating unit 105 sets RAPS of the V-PCC content as RAPS of the content stream of the metadata. Next, the file generating unit 105 sets the DST of RAPS of the content stream of the metadata representing RAPS of the V-PCC content as a reference and obtains an offset value for the DTS of RAPS of a component stream that deviates from the above DST. Then, the file generating unit 105 newly generates a VPCCRapinfoBox for storing the RAP information of the V-PCC content. The file generating unit 105 further stores, in the newly generated VPCCRapinfoBox, information of whether or not the DTSs of RAPs of the respective component streams match. Then, for a component stream of which DTS of RAPs does not match, an offset value based on the DTS of RAPs of the content stream of the metadata is stored.

FIG. 16 is a diagram illustrating an example of syntax in which the RAP information of the V-PCC content according to the third embodiment is stored. The file generating unit 105 generates a new VPCCRapinfoBox that stores, for example, syntax 510 illustrated in FIG. 16 The file generating unit 105 indicates that the DTS of RAPs of the component stream matches the DTS of RAPs of the component stream of the metadata by setting the value of is_DTS_aligned in the syntax 510 to 1. On the contrary, the file generating unit 105 indicates that the DTS of RAPs of the component stream is different from the DTS of RAPs of the metadata stream by setting the value of is_DTS_aligned in the syntax 510 to 0. Then, the file generating unit 105 gives an offset value with sample_offset of the syntax 510 on the basis of the DTS of RAPs of the component stream of the metadata.

Here, although an offset in the number of samples is set in this embodiment, the method of displaying the position of a RAP of a component stream having RAPs at a DTS different from that of RAPs of the component stream of the metadata is not limited thereto. For example, the file generating unit 105 may omit the sample_offset of the syntax 510 and specify, by distance, a coding start position for decoding RAPs of the respective component streams. In this case, the client apparatus 2 configures a point cloud at a CTS of RAPS of the t metadata after decoding.

In addition, the file generating unit 105 may additionally set, in the syntax 510, is_decode_optional in Modification 3 of the second embodiment illustrated in FIG. 14. In this case, the client apparatus 2 waits for a next RAP of a component stream that is not decoded and starts decoding of the component stream from that point.

The file generating unit 105 also specifies how to deal with a case where there are no RAPS in the syntax 460.

As described above, the file generating apparatus according to the present embodiment achieves random access by encoding with an encoding structure that is optimum for each of the components and setting an offset value from a reference position. As a result, it is possible to easily provide a viewing experience that meets the needs of a viewer while improving the encoding efficiency.

4. Fourth Embodiment

Next, a fourth embodiment will be described. A file generating apparatus 1 and a client apparatus 2 according to the present embodiment are also represented by the block diagrams of FIGS. 2 and 5. In the following description, description of a function of each unit that is similar to that of the first embodiment will be omitted.

The file generating unit 105 may generate the total number of samples required for decoding samples of respective component streams that include RAPS and store the number in an ISOBMFF file. FIG. 17 is a diagram illustrating an example of syntax in which RAP information of a V-PCC content according to the fourth embodiment is stored. The file generating unit 105 registers, in a VPC-CRapinfoBox that is newly generated, total_distance which indicates the total number of samples that need to be additionally decoded in order to decode samples of the respective component streams including RAPS. This total_distance is provided by the creator of a content. The total_distance is an index of ease regarding the process of performing random access. The smaller this total_distance is, the easier it is to process.

The file processing unit 221 of the client apparatus 2 acquires a total_distance from the VPCCRapInfoBOX. Then, in a case where predetermined time is specified as time of random access, the file processing unit 221 detects a RAP whose DTS is close to that time and with which a decoding process of a component stream included in the V-PCC content is easy.

As described above, the file generating apparatus according to the present embodiment registers an index of ease regarding the process of performing random access. As a result, the client apparatus can easily specify a RAP with which decoding is easy, reduce the process, and thereby easily provide a viewing experience that meets the needs of a viewer.

5. Fifth Embodiment

Next, a fifth embodiment will be described. A file generating apparatus 1 and a client apparatus 2 according to the present embodiment are also represented by the block diagrams of FIGS. 2 and 5. In the following description, description of a function of each unit that is similar to that of the first embodiment will be omitted.

The file generating unit 105 according to the present embodiment uses an alternative track. An alternative track is a track that is alternative to a track of each component and can be used in a similar usage but can be used for another purpose. An alternative track holds the same information as that of a track of each component stream but has a different codec. The file generating unit 105 stores, in an alternative track, RAP information of a V-PCC content that can be used in combinations of tracks of all the component streams in a shared manner. Alternatively, the file generating unit 105 stores, in an alternative track, RAP information of the V-PCC content that is different for every combination of tracks. As a result, the file processing unit 221 of the client apparatus 2 can acquire RAP information of the V-PCC content that corresponds to a combination of tracks of component streams to be used by referring to the alternative track. The client apparatus 2 can perform random access using RAPs of the V-PCC content specified by the file processing unit 221.

Although the embodiments of the present disclosure have been described above, the technical scope of the present disclosure is not limited to the above-described embodiments as they are, and various modifications can be made without departing from the gist of the present disclosure. In addition, components of different embodiments and modifications may be combined as appropriate.

Note that effects described herein are merely examples and thus are not limited. Other effects may also be included.

Note that the present technology may employ configurations as follows.

(1) An information processing apparatus including:
a data acquiring unit that acquires a content including a plurality of component streams; and
a file generating unit that generates content RAP information indicating random access points of the content on the basis of random access points of the component streams of the content acquired by the data acquiring unit.

(2) The information processing apparatus according to item (1), in which the file generating unit generates a content file in which the content RAP information is stored in a metadata area of the file.

(3) The information processing apparatus according to item (2),
in which the content is V-PCC content, and
the content file is an ISOBMFF-compliant file.

(4) The information processing apparatus according to item (3),
in which the component streams are encoded so that CTSs at random access points of every component stream are same, and
the file generating unit further stores, as the content RAP information, information regarding the random access points having same DTSs at the random access points of the respective component streams.

(5) The information processing apparatus according to item (4), further including:
an encoding unit that generates the component streams by encoding so that, in all of the component streams, each of the random access points have a same DTS,
in which the file generating unit further stores, as the content RAP information, identification information indicating that the CTSs at the random access points of the respective component streams are same and that the DTSs at the random access points of the respective component streams are also same.

(6) The information processing apparatus according to item (4) or (5), in which the content RAP information is stored as random access point information of a metadata component stream.

(7) The information processing apparatus according to item (3),
in which the content includes a plurality of component streams that is included in a point cloud frame as the component streams, and
in a case where DTSs of samples of the respective component streams included in the point cloud frame match, the file generating unit generates the content RAP information indicating that a first position, at which the component streams that have been encoded all have a random access point, is a random access point of the content and stores the content RAP information that has been generated in a new BOX added to the content file.

(8) The information processing apparatus according to item (7), in which the file generating unit generates the content RAP information indicating that a second position, at which a part of each of the component streams that have been encoded is not a random access point, is also a random access point of the content in addition to the first position and stores the content RAP information that has been generated in the new BOX.

(9) The information processing apparatus according to item (8),
in which the file generating unit stores, in the new BOX, information indicating a decoding start position for decoding the component stream in which a sample at the second position is not the random access point.

(10) The information processing apparatus according to item (8) or (9), in which the file generating unit generates the content RAP information by storing, in the new BOX, information indicating a position of a sample that is a random access point of the content among samples of each of the component streams in a case where DTSs of samples of the respective component streams after encoding do not match.

(11) The information processing apparatus according to item (10), in which the file generating unit generates the content RAP information by storing, in the new BOX, a total number of samples of each of the component streams used for decoding the random access points of the content.

(12) The information processing apparatus according to any one of items (8) to (11), in which the file generating unit stores, in the new BOX, a flag indicating whether or not a point cloud can be created without decoding the component stream in which a sample at the second position is not the random access point.

(13) An information processing method for causing a computer to execute processes including the steps of:
acquiring a content including a plurality of component streams; and
generating content RAP information indicating random access points of the content newly as metadata on the basis of random access point information of the component streams of the content that has been acquired.

(14) A reproduction processing apparatus including:
a file acquiring unit that receives information of a content including a plurality of component streams;
a file processing unit that acquires content RAP information indicating a random access point of the content from the information of the content that has been received by the file acquiring unit and specifies a random access point of each of the component streams from the content RAP information; and
a display information generating unit that reproduces the content from a random access point of each of the component streams specified by the file processing unit.

(15) A reproduction processing method for causing a computer to execute processes including the steps of:
receiving information of a content including a plurality of component streams;
acquiring content RAP information indicating a random access point of the content from the information of the content;
specifying a random access point of each of the component streams on the basis of the content RAP information that has been acquired; and
reproducing the content from a random access point of each of the component streams that has been specified.

REFERENCE SIGNS LIST

1 File generating apparatus
2 Client apparatus
3 Web server
10 Generation processing unit
11 Control unit
20 Reproduction processing unit
21 Control unit
101 Data acquiring unit
102 Conversion unit
103 Encoding unit
104 Stream generating unit
105 File generating unit
106 Transmission unit
201 File acquiring unit
202 Data analysis and decoding unit
203 Display unit
221 File processing unit
222 Decoding processing unit
223 Display information generating unit

The invention claimed is:
1. An information processing apparatus comprising:
circuitry configured to:
acquire a content including a plurality of component streams, wherein the plurality of component streams include a metadata stream;
generate content random access point (RAP) information indicating random access points of the content on a basis of random access points of the component streams of the acquired content;
generate a content file in which the content RAP information is stored in a metadata area,
wherein the content is video codec based point cloud compression (V-PCC) content, and the content file is an ISOBMFF-compliant file, and wherein, based on the content RAP information stored in the metadata area, content RAP information of the plurality of component streams are determined; and store a flag in a sample entry of a metadata track for the metadata stream, wherein the flag indicates that the content RAP information stored in the metadata stream is RAP information of the V-PCC content that satisfies a condition that the content RAPs are of a same type in the plurality of component streams.

2. The information processing apparatus according to claim 1, wherein the plurality of component streams are included in a point cloud frame as the component streams, and in a case where DTSs of samples of the respective component streams included in the point cloud frame match, the circuitry generates the content RAP information indicating that a first position, at which the component streams that have been encoded all have a random access point, is a random access point of the content and stores the content RAP information that has been generated in a sample entry that is included into the content file.

3. An information processing method for causing circuitry to execute processes comprising the steps of:

acquiring a content including a plurality of component streams, wherein the plurality of component streams include a metadata stream;

generating content RAP information indicating random access points of the content on a basis of random access points of the component streams of the content that has been acquired;

generating a content file in which the content RAP information is stored in a metadata area, wherein the content is video codec based point cloud compression (V-PCC) content, and the content file is an ISOBMFF-compliant file, and wherein, based on the content RAP information stored in the metadata area, content RAP information of the plurality of component streams are determined; and storing a flag in a sample entry of a metadata track for the metadata stream, wherein the flag indicates that the content RAP information stored in the metadata stream is RAP information of the V-PCC content that satisfies a condition that the content RAPs are of a same type in the plurality of component streams.

4. A reproduction processing apparatus comprising:
circuitry configured to:
receive information of a content including a plurality of component streams, wherein the plurality of component streams include a metadata stream;

acquire content RAP information indicating a random access point of the content from the information of the content that has been received and specify a random access point of each of the component streams from the content RAP information;

reproduce the content from a random access point of each of the component streams;

determine, based on the content RAP information stored in a metadata area, content RAP information of the plurality of component streams, wherein the content is video codec based point cloud compression (V-PCC) content, and a content file in which the content RAP information is stored in the metadata stream of the file is an ISOBMFF-compliant file; and store a flag in a sample entry of a metadata track for the metadata stream, wherein the flag indicates that the content RAP information stored in the metadata stream is RAP information of the V-PCC content that satisfies a condition that the content RAPs are of a same type in the plurality of component streams.

5. The reproduction processing apparatus of claim 4, wherein the content RAP information of the plurality of component streams are aligned.

6. The reproduction processing apparatus of claim 4, wherein it is determined whether the content RAP information of the plurality of component streams are aligned.

7. A reproduction processing method for causing circuitry to execute processes comprising:

receiving information of a content including a plurality of component streams, wherein the plurality of component streams include a metadata stream;

acquiring content RAP information indicating a random access point of the content from the information of the content;

specifying a random access point of each of the component streams on a basis of the content RAP information that has been acquired;

reproducing the content from a random access point of each of the component streams that has been specified; and determining, based on the content RAP information stored in a metadata area, content RAP information of the plurality of component streams, and wherein the content is video codec based point cloud compression (V-PCC) content, and a content file in which the content RAP information is stored in the metadata stream of the file is an ISOBMFF-compliant file; and storing a flag in a sample entry of a metadata track for the metadata stream, wherein the flag indicates that the content RAP information stored in the metadata stream is RAP information of the V-PCC content that satisfies a condition that the content RAPs are of a same type in the plurality of component streams.

* * * * *